United States Patent
Völkel

(10) Patent No.: US 11,697,921 B2
(45) Date of Patent: Jul. 11, 2023

(54) METHODS, SYSTEMS, APPARATUS, AND ARTICLES OF MANUFACTURE TO CONTROL A HOLOGRAPHIC DISPLAY OF A VEHICLE

(71) Applicant: HAMM AG, Tirschenreuth (DE)

(72) Inventor: Werner Völkel, Neustadt a.d. Waldnaab (DE)

(73) Assignee: HAMM AG, Tirschenreuth (DE)

( * ) Notice: Subject to any disclaimer, the term of this patent is extended or adjusted under 35 U.S.C. 154(b) by 513 days.

(21) Appl. No.: 16/635,461

(22) PCT Filed: Jul. 31, 2018

(86) PCT No.: PCT/US2018/044674
§ 371 (c)(1),
(2) Date: Jan. 30, 2020

(87) PCT Pub. No.: WO2019/028066
PCT Pub. Date: Feb. 7, 2019

(65) Prior Publication Data
US 2021/0087795 A1     Mar. 25, 2021

(30) Foreign Application Priority Data
Jul. 31, 2017   (DE) .................... 10 2017 117 223.8

(51) Int. Cl.
*E02F 9/26*        (2006.01)
*E02F 9/20*        (2006.01)
(Continued)

(52) U.S. Cl.
CPC ............ *E02F 9/264* (2013.01); *E02F 9/2004* (2013.01); *B60K 37/06* (2013.01);
(Continued)

(58) Field of Classification Search
CPC . E02F 9/2004; E02F 9/264; E02F 9/26; E02F 9/2012; B60K 35/00;
(Continued)

(56) References Cited

U.S. PATENT DOCUMENTS

2004/0104948 A1   6/2004  Schockmel et al.
2004/0254699 A1*  12/2004 Inomae .................. G06F 3/017
                                                      701/1
(Continued)

FOREIGN PATENT DOCUMENTS

DE    102004022494    12/2004
DE    102010037535    3/2012
(Continued)

OTHER PUBLICATIONS

International Bureau, International Preliminary Report on Patentability, issued in connection with International Application No. PCT/US2018/044674, dated Feb. 13, 2020, 8 pages.

(Continued)

*Primary Examiner* — Yaron Cohen
(74) *Attorney, Agent, or Firm* — Hanley, Flight & Zimmerman, LLC

(57) ABSTRACT

According to one example, a working machine includes a projection arrangement to generate a hologram, wherein the hologram presents a virtual operating element or a virtual display and a movement/position detection arrangement to detect a movement or a position of an operator. The working machine of the example also includes a control unit to control the operation of the working machine based on the detected movement or position of an operator and based on the basis of the hologram generated by the projection arrangement, wherein the projection arrangement is to generate the hologram at different positions or with different content in association with different operating positions to (Continued)

be assumed by an operator on an operator platform or the movement/position detection arrangement is designed to detect the movement or the position of an operator in different operating positions on the operator platform.

22 Claims, 2 Drawing Sheets

(51) Int. Cl.
    *B60K 37/06*     (2006.01)
    *E01C 19/26*     (2006.01)
    *G03H 1/00*     (2006.01)
    *G06F 3/01*     (2006.01)

(52) U.S. Cl.
    CPC .... *B60K 2370/155* (2019.05); *B60K 2370/61* (2019.05); *E01C 19/26* (2013.01); *E01C 2301/30* (2013.01); *G03H 1/0005* (2013.01); *G03H 2001/0061* (2013.01); *G06F 3/017* (2013.01)

(58) Field of Classification Search
    CPC ............ B60K 2370/29; B60K 2370/61; B60K 37/06; B60K 2370/155; G06F 3/04815; G06F 3/011; G06F 3/017; E01C 19/26; E01C 2301/30; G03H 1/0005; G03H 2001/0061; G01S 13/88
    See application file for complete search history.

(56) References Cited

U.S. PATENT DOCUMENTS

| | | |
|---|---|---|
| 2013/0305717 A1 | 11/2013 | Roehr et al. |
| 2014/0282267 A1 | 9/2014 | Vogelmeier et al. |
| 2016/0266610 A1 | 9/2016 | Nessel |
| 2016/0364003 A1 | 12/2016 | O'Brien |
| 2018/0129048 A1* | 5/2018 | Robbins ............. G02B 27/0172 |

FOREIGN PATENT DOCUMENTS

| | | |
|---|---|---|
| DE | 10 2011 005 275 | 9/2012 |
| EP | 1 352 301 | 10/2003 |
| EP | 2803530 | 11/2014 |
| EP | 3067774 | 9/2016 |
| JP | H0346724 | 2/1991 |
| JP | H09190278 | 7/1997 |

OTHER PUBLICATIONS

German Patent Office, Research Report, issued in connection with German Patent Application No. 10 2017 117 223.8 dated May 14, 2018, with machine English translation, 17 pages.

International Searching Authority, International Search Report and Written Opinion, issued in connection with International Application No. PCT/US2018/044674, dated Nov. 21, 2018, 15 pages.

European Patent Office, "Communication Pursuant to Article 94(3) EPC," issued in connection with European Patent Application No. 18 760 095.2 dated Jul. 21, 2021, 6 pages.

European Patent Office, "Communication Pursuant to Article 94(3) EPC," issued in connection with European Patent Application No. 18 760 095.2 dated Aug. 29, 2022, 4 pages.

Brazilian National Institute of Industrial Property, "Written Opinion," issued in connection with Brazilian Application No. BR112020001890-2, dated Nov. 10, 2022, 6 pages.

European Patent Office, "Intention to Grant," issued in connection with European U.S. Appl. No. 18/760,095 2, dated Mar. 21, 2023, 24 pages.

* cited by examiner

METHODS, SYSTEMS, APPARATUS, AND ARTICLES OF MANUFACTURE TO CONTROL A HOLOGRAPHIC DISPLAY OF A VEHICLE

CROSS REFERENCE TO RELATED APPLICATION

This patent arises from an application that is National Stage Application of International Application No. PCT/US2018/044674, filed on Jul. 31, 2018, which is hereby incorporated by reference in its entirety. Further, this patent claims priority to German Application DE 10 2017 117 223.8, filed Jul. 31, 2017. German Application DE 10 2017 117 223.8 is hereby incorporated herein by reference in its entirety.

FIELD OF THE DISCLOSURE

The present disclosure relates to a working machine and, in particular, to a utility vehicle. In some examples, a working machine described herein may propel itself during performance of the working process, such as a soil compactor.

BACKGROUND

A working machine 10 designed as a self-propelled soil compactor is shown in FIG. 1 and is known from DE 10 2011 005 275 A. The working machine 10 is designed as a soil compactor having a rear carriage 12 including drive wheels 14 driven by a drive unit. A compactor roller 18 for compacting the ground 20 on which the working machine 10 (i.e., the soil compactor) moves is rotatably supported on a front carriage 16. The front carriage 16 is pivotable relative to the rear carriage 12 to facilitate steering of the working machine 10.

An operator platform 22, on which a work station 24 for an operator 26 is provided, is also provided on the rear carriage 12. In the illustrated example, the work station 24 includes a seat 28 on which the operator 26 can sit for working with the working machine 10.

In association with the work station 24, operating elements, such as a control lever for controlling movement of the working machine 10, are disposed on an operating element carrier 30 and are coupled to the work station. Other operating elements such as switches or rotary knobs can be provided on the operating element carrier 30 or on a control panel 34, such as a dashboard.

To offer the operator of such machines the possibility of being able to observe the work processes being carried out from different positions, the operator can assume different operating positions on the operator platform. For example, the work station 24 provided on the operator platform 22 can be brought into several work station positions. For example. The work station 24 can be rotated about a vertical axis V or/and moved transversely to a working machine longitudinal direction L, which generally corresponds to the working direction in a self-propelled working machine.

DETAILED DESCRIPTION

Figure 1:
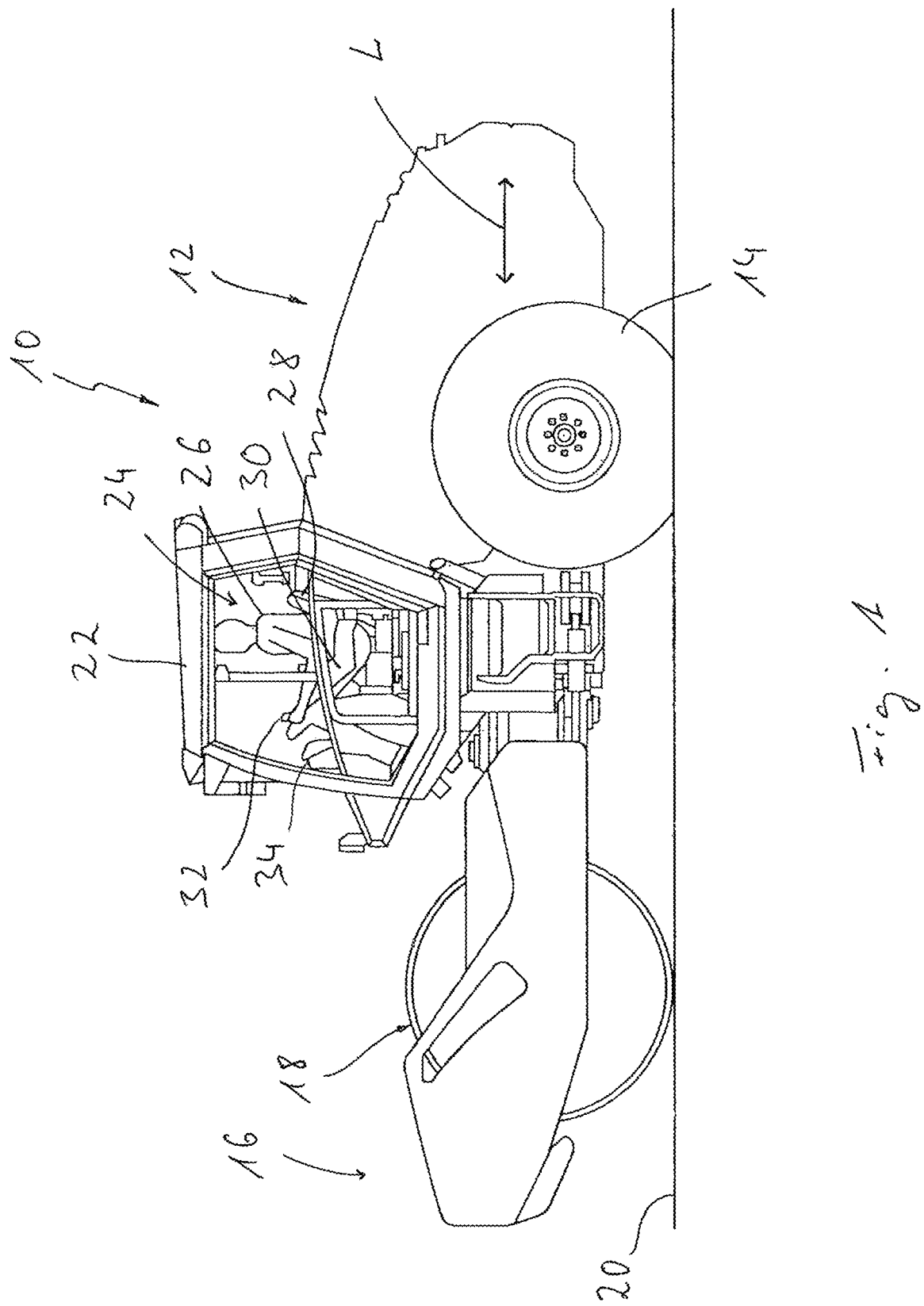
FIG. 1 shows a working machine constructed as a soil compactor.

Use of a working machine, such as the working machine 10 of FIG. 1 may be more difficult, particularly if, for reasons of space, the operating elements or parts thereof or the displays provided on the operator platform cannot also be brought into different positions adapted to the different operating positions. The provision of multiple control panels is generally not desired for reasons of space and particularly, also for reasons of cost and general clarity.

As described herein, a working machine, more particularly a utility vehicle, has improved operability for an operator.

According to the invention, the problem is solved by a working machine. In one example, the working machine may include a projector to generate a hologram, wherein the hologram presents visual information; a sensor to sense an position attribute associated with a position of an operator; and a controller to control the projector to change a projection attribute of the hologram based on the sensed position attribute of an operator on an operator platform.

In a working machine constructed or equipped according to this disclosure, all or part of the operating elements or/and displays necessary for operating the machine are provided in the form of a hologram as virtual operating elements or displays. This means that substantially no installation space has to be reserved for these operating elements or displays themselves. It is only necessary to provide appropriate construction space on the machine for the projection arrangement. The operating elements or displays are to be generated virtually by the projection arrangement and can then also be generated according to specifications of the operator, particularly in their design, their size or their appearance. Additionally, with respect to the operating elements or displays that are to be displayed virtually or not, the operating elements or displays can be perceived by the operator as a virtual three-dimensional visual image without 3D glasses or other aids.

The virtually generated operating elements or displays that are produced may be adapted to different operating positions to be assumed by the operator, The virtually generated operating elements may also be displayed at different locations, and can detect interaction with the virtual operating element by detecting movement of an operator with the movement/position detection arrangement. Accordingly, the system is able to provide appropriate information for performing a work process according to the specifications corresponding to the virtual actuation of one or more virtual operating elements, thereby allowing the operator to control a working machine in different operating positions in a comfortable manner and thus be able to carry out the work process to be performed by such a working machine with high quality.

In order to make the work process to be performed with a working machine designed according to the invention as easy for the operator to control as possible, it is proposed to design the projection arrangement to generate the hologram with content dependent on the working status of the working machine. For example, only those operating elements or displays that are actually used in a work process currently being performed, or that can provide relevant information to the operator, can be generated in the form of a hologram. All the operating elements and/or displays that do not need to be operated in the working process currently being performed, or that deliver information not relevant to this working process, are not displayed or are displayed with reduced size in the background. Alternatively or additionally, the projection arrangement can be designed to generate the hologram with information that can be defined by an operator. By interaction with the hologram generated by the projection arrangement, the operator can specify before starting the working process which content, i.e. which virtual operating elements and/or displays, is to be presented and also in what manner, for example in what size or in what area of the hologram the content is to be presented. This presentation can also be modified by interaction of the operator with the hologram even during a working process, for example by performing swiping movements with which contents can be removed from the hologram or pushed to a peripheral area, whereas other content can be represented in enlarged form or/and brought into a central region of the hologram for interaction with an operator.

For a reliable detection of the movement and/or position of an operator, a movement/position detection arrangement may utilize optical or/and acoustic detection of a movement or/and position of an operator. In one example, the movement/position detection arrangement includes at least one camera. Other or additional detection arrangements such as ultrasound sensors or radar sensors can also be used for detecting the movement or the position of an operator.

Because it can generally be assumed that not all operating elements or displays can be presented virtually, for security reasons among others, for easier operability of a working machine at least one operating element or/and at least one display can be placed in different projection/display positions in correlation with different operating positions to be assumed by an operator on the operator platform.

The operator platform can comprise at least one work station, wherein the work station can be moved to different work station positions in correlation with different operating positions to be assumed by an operator. The projection arrangement or/and the movement/position detection arrangement can also be moved to different projection/detection positions in correlation with different work station positions. For example, the work station can be rotatable about a substantially vertical axis of rotation or/and movable substantially perpendicular to a longitudinal direction of the working machine.

In order to make handling as simple as possible for the operator, it is proposed that the projection arrangement or/and the movement/position detection arrangement can be moved together with the work station.

A working machine constructed according to the principles of the present invention can be used in a wide variety of fields. Thus the working machine can be a construction machine, particularly an excavator, a backhoe or an earthmover. The working machine can also be constructed as a road construction machine, particularly a soil compactor, an asphalt machine or a road-milling machine. In addition, the working machine can be an agricultural machine, particularly a tractor or a harvesting machine such as a combine harvester or the like. Finally the principles disclosed herein can also be applied to a forklift provided as a working machine. All these types of machines are considered utility vehicles within the meaning of this disclosure, also including Unimogs or other general-purpose vehicles used as municipal vehicles, which can be equipped with a lateral mower to be operated by the operator, for example.

The principles of examples of the present invention are described below with reference to FIG. 2. It should be pointed out that the principles described herein can be applied for example to a working machine 10 designed as a soil compactor, as shown in FIG. 1. Of course the principles of the present invention can also be applied to any other stationary or mobile working machine in which, due to the work process to be performed, it is necessary for an operator to control such a work process from different operating positions in a control station, or the operator has the possibility of doing so.

Figure 2:
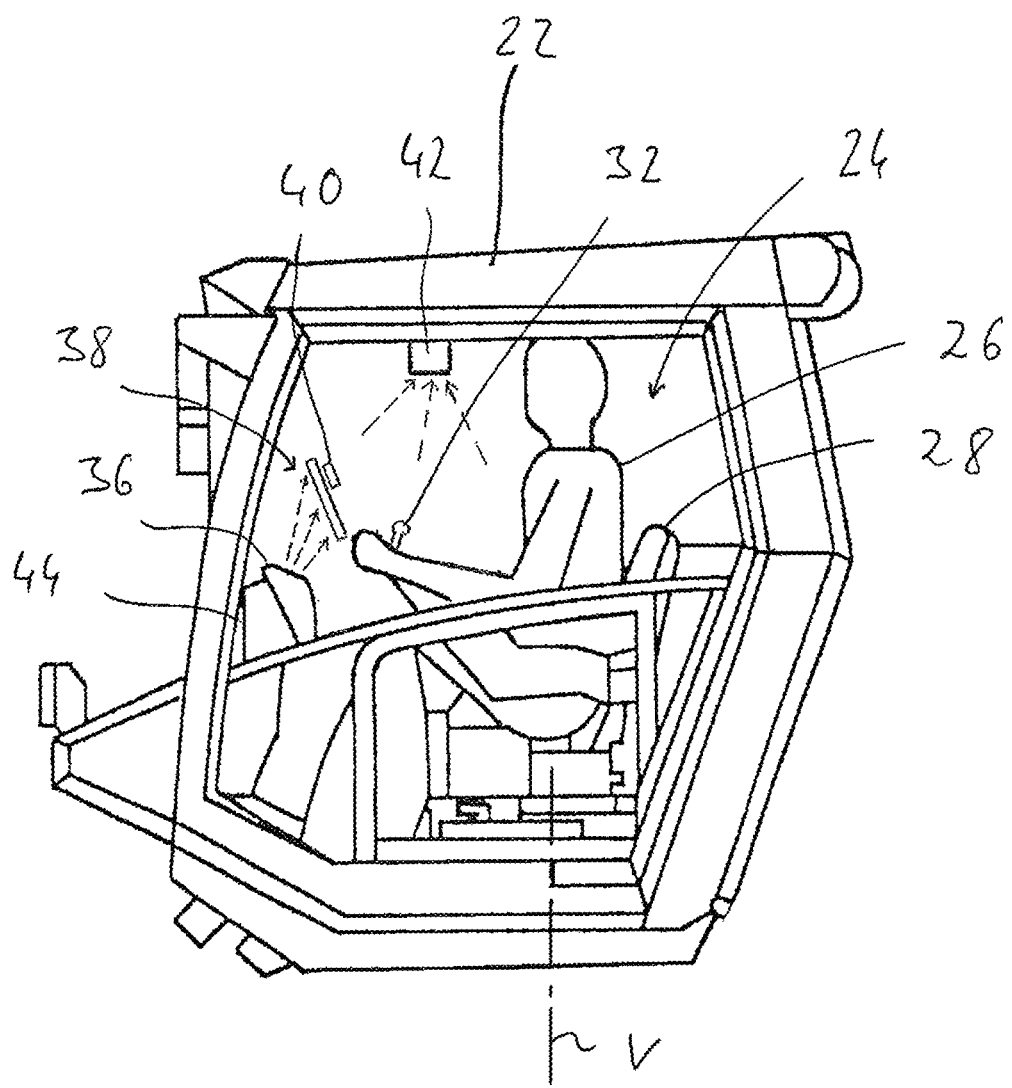
FIG. 2 shows an improved operator platform of a working machine.

FIG. 2 shows for the sake of example an operator platform 22 designed in the form of a driver's cab in which, as already described in relation to FIG. 1, a work station 24 for an operator 26 is provided. This work station 24 can also comprise a seat 28, for example, which can be rotatable about a substantially vertical axis V in order to allow the operator 26 to operate the working machine having such an operator platform in different operating positions. As also explained in relation to FIG. 1, operating elements, such as a control lever 32 and displays, can be provided in correlation with the work station 24 and can be mechanically coupled to the work station 24, in particular the seat 28, in order to move these operating elements and/or displays along when the work station 24 is moved, and thus give the operator 26 the opportunity to be able to operate and/or control a working machine independently of a work station position specified for the work station 24.

On or in the operator platform 22, a projection arrangement labeled 36 as a whole is also provided. The projection arrangement 36 is designed to generate, for example, a hologram 38 as a projection using known projection technologies. Such a hologram 38 creates the impression for a person viewing it that the projection thus generated is floating in the air as a three-dimensional body and could be touched by the person. Of course, a number of holograms may be utilized. The projection generated by the projection arrangement 36, i.e. the hologram 38, presents at least one virtual operating element 40, for example a rotary knob, a slider or a switch, or/and at least one display visually perceptible by the operator 26 that can display information relevant to an ongoing working process, for example the speed of an internal combustion engine or the like. The hologram 38 can present a virtual control panel, which contains multiple operating elements or displays of this kind that appear to the operator 26 to be virtual three-dimensional bodies floating in space.

Because operating elements or displays are generated virtually by the projection arrangement 36, it is easily possible, by selecting the content to be displayed, to present only the operating elements or displays that are of interest to the operator 26, depending on the work process being performed or the operating position occupied by the operator. Operating elements or displays that are not necessary, and thus could merely contribute to confusing the operator 26, are not presented or are smaller in the background. It is also fundamentally possible for an operator to specify before or during the working process by an appropriate selection which operating elements or displays are to be presented and in what manner in relation to given work processes. This selection possibility can also be achieved by appropriate operating elements in the control panel provided virtually by the hologram 38.

A movement/position detection arrangement designated 42 as a whole is provided in order to be able to detect the interaction of the operator 26 with the projection generated by the projection arrangement 36. This movement/position detection arrangement 42, which may include one or more cameras for example, supplies corresponding image signals or detection signals to a control unit labeled 44 as a whole. The control unit 44 can be constructed with microprocessors or/and other electronic circuit units in which programs are stored that, by evaluating the signals supplied by the movement/position detection arrangement 42, supply information on the position of the operator 26 and in particular also on the movements carried out by the operator 26 in the region of the projection, i.e. the hologram 38. For this purpose, a gesture database can be stored in the control unit 44, in which movements or gestures of an operator corresponding to actuation of or action upon an operating element or a display are provided in correlation with the virtual operating elements or displays presented by the hologram 38. By evaluating images or signals with respect to movements carried out by an observed operator in conjunction with the information regarding the contents of the currently generated projection, it is thus possible, for example, to detect the virtual operating element towards which the operator 26 is moving his hand and how the operator 26 operates this virtual operating element. The information representing this virtual operation of a virtual operating element can in turn be used to correspondingly activate a system region of the working machine that is linked to such a virtually actuated operating element.

In order to provide the operator, in relation to different operating positions occupied by the operator 26 on the operator platform 22, e.g. different positions of the work station 24, with the possibility of interacting ergonomically with the hologram 38 and thus being able to make a virtual operation of the virtual operating element, the projection arrangement 36 and the movement/position detection arrangement are designed according to the invention to generate the projection or the hologram 38 at different locations and detect the interaction of the operator 26 with the hologram 38 at different locations. For this purpose, the projection arrangement 36 can be designed to position the hologram 38 at different positions or in different directions. The projection arrangement 36 can also be mechanically coupled to the work station 24 such that, if the work station 24 moves, the projection arrangement 36 is also moved, for example in such a manner that when the seat 28 is rotated about the vertical axis V, the projection arrangement 36 and thus the hologram 38 are pivoted about the axis V and therefore remain in the field of view of the operator 26.

For example, the movement/position detection arrangement 42 can be positioned on the operator platform 22 such that it is always capable of detecting the interaction of the operator 26 with the hologram 38 and delivering corresponding signals, independently of the operating position of the operator 26. Alternatively, the movement/position detection arrangement 42, for example, can also be movable on the operator platform 22 together with the work station 24. The assumption of a new or different operating position or a different work station position can be detected by the movement/position detection arrangement for example, or by other movement sensors assigned to the work station 24, so that this information can also be used to adapt the contents of the hologram 38 to different operating positions of this kind and to present only those contents that are relevant in relation to a respective operating position.

The operating concepts according to the examples disclosed herein for a working machine make it possible to adapt in a simple manner to different working machines by varying the contents presented by means of the hologram, without having to undertake substantial adjustment measures in the hardware area. Because the interaction of an operator is detected by the movement/position detection arrangement and evaluated by the control unit, there is the additional possibility of detecting whether the operation undertaken by the operator when interacting with a given operating element makes sense or is correct, or whether perhaps there may have been a faulty operation. If a faulty operation is detected, an appropriate warning can be generated so that the operator can be given the opportunity to perform a correct operation. In general, the operator can have the opportunity to determine the presentation content of the program himself, at least to a certain extent. Interaction with the hologram can give the operator an opportunity to select virtual operating elements or displays that are to be displayed for a work process to be performed or are to be displayed in the foreground or enlarged due to special importance, for example. Displayed content such as virtual displays or/and virtual operating elements that an operator does not require at a given time can be removed from the hologram by a swiping movement or a pushing movement by the operator for example, or can be pushed into a peripheral area so that they can again be selected for representation by an opposite movement.

In a working machine designed according to the examples of this disclosure, the movements or the position of an operator can be recorded by a wide variety of sensors or sensing means, such as cameras. Other sensors that record the instantaneous position and, via the progression thereof, also the movement of an operator, such as ultrasound sensors or radar sensors of the type used as distance sensors in automotive engineering, can also be applied.

Finally it should be noted that, within the meaning of the examples disclosed herein, a projection to be produced by a projection arrangement, designated here as a hologram, is also any other type of such projection that preferably enables virtual interaction of an operator with the projection, for example displayed operating elements, by the creation of a three-dimensional perceptual impression. An operator platform within the meaning of the exampled disclosed herein can be provided by a driver's cab, for example, in which one or more persons can occupy multiple different operating positions for operating the working machine. Different operating positions in an operator platform can also be achieved by bringing the entire operator platform along with the operator into different positions on a working machine, so that the operator assumes the same position relative to the operator platform, but assumes different operating positions on the working machine. In addition, an operator platform can have a plurality of areas not necessarily adjoining one another or spatially connected to one another, to which an operator can move in order to operate the machine from there. For example, one area of an operator platform can be provided by a drivers cab from which an operator steers the working machine during forward travel, for example in order to move the working machine to a predetermined location. An additional area of the operator platform can be provided at a different position on the working machine, so that from this area, an operator can control the working machine when carrying out the work process. In both or in multiple areas of the operator platform, operating elements and/or displays can be provided, via which an operator can operate the working machine and receive relevant information for the working process. In correlation with such different areas of an operator platform and corresponding to different operating positions, the projection arrangement can be designed to generate, after appropriate activation, the hologram or a hologram where the operator is located and from where the operator is operating the working machine. For this purpose, the projection arrangement can comprise a plurality of separately operable regions each designed for generating a hologram. Alternatively, the projection arrangement can be designed such that it can be moved from one area of the operator platform to another area in order to generate a hologram correlated to different operating positions in this manner. This applies accordingly to the movement/position detection arrangement.

The invention claimed is:

1. A working machine, comprising:
a projection arrangement to generate a hologram;
a movement/position detection arrangement to detect at least one of a movement or a position of an operator;
an operator platform including a work station, the work station including a seat movable between first and second work station positions, the movement/position detection arrangement to detect a current work station position of the seat, the projection arrangement to adjust content of the hologram based on the current work station position, the hologram to present at least one of a first virtual operating element or a first virtual display when the seat is in the first work station position, the hologram to present at least one of a second virtual operating element or a second virtual display when the seat is in the second work station position, the at least one of the first virtual operating element or the first virtual display different from the at least one of the second virtual operating element or the second virtual display; and
a control unit to control the operation of the working machine based on the at least one of the movement or the position of the operator and based on the hologram generated by the projection arrangement,
wherein at least one of (a) the projection arrangement is to generate the hologram at different positions or with different content in association with different operating positions to be assumed by the operator on the operator platform or (b) the movement/position detection arrangement is to detect the at least one of the movement or the position of the operator in the different operating positions on the operator platform.

2. The working machine according to claim 1, wherein the projection arrangement is to generate the hologram with the content depending on a working status of the working machine, or the projection arrangement is to generate the hologram with the content definable by the operator.

3. The working machine according to claim 2, wherein the movement/position detecting arrangement includes optical or acoustic detection of the at least one of the movement or the position of the operator.

4. The working machine according to claim 1, wherein the movement/position detecting arrangement includes optical or acoustic detection of the at least one of the movement or the position of the operator.

5. The working machine according to claim 4, wherein the movement/position detection arrangement includes a camera.

6. The working machine according to claim 1, wherein at least one of the first virtual operating element the first virtual display, the second virtual operating element, or the second virtual display can be positioned in different positions corresponding to the different operating positions to be assumed by the operator on the operator platform.

7. The working machine according to claim 1, wherein the first and second work station positions correspond to the different operating positions to be assumed by the operator, at least one of the projection arrangement or the movement/position detection arrangement to be positioned in different projection/detection positions corresponding to the first and second work station positions.

8. The working machine according to claim 7, wherein the work station is at least one of rotatable about a substantially vertical axis of rotation or movable substantially perpendicular to a longitudinal direction of the working machine.

9. The working machine according to claim 7, wherein at least one of the projection arrangement or the movement/position detection arrangement can be moved together with the work station.

10. The working machine according to claim 1, wherein the working machine includes a construction machine, a road construction machine, an agricultural machine, or a forklift.

11. The working machine according to claim 1, wherein the projection arrangement is to adjust the content by at least one of (a) removing the first virtual operating element or the first virtual display or (b) presenting the second virtual operating element or the second virtual display.

12. The working machine according to claim 1, wherein the projection arrangement is to adjust the content by adjusting a size of at least one of the first virtual operating element, the first virtual display, the second virtual operating element, or the second virtual display.

13. The working machine according to claim 1, wherein the first virtual operating element is to control a first operation of the working machine and the second virtual operating element is to control a second operation of the working machine, the first operation different from the second operation.

14. The working machine according to claim 1, wherein the first virtual display is to present first information associated with a working process of the working machine and the second virtual display is to present second information associated with the working process of the working machine, the first information different from the second information.

15. A working machine, comprising:
a projector to generate a hologram, the hologram to present visual information;
a sensor to sense a position attribute associated with a position of an operator;
an operator platform including a work station, the work station including a seat movable between first and second work station positions, the sensor to detect a current work station position of the seat, the projector to adjust content of the hologram based on the current work station position, the hologram to present at least one of a first virtual operating element or a first virtual display when the seat is in the first work station position, the hologram to present at least one of a second virtual operating element or a second virtual display when the seat is in the second work station position, the at least one of the first virtual operating element or the first virtual display different from the at least one of the second virtual operating element or the second virtual display; and
a controller to control the projector to change a projection attribute of the hologram based on the sensed position attribute of the operator on the operator platform.

16. The working machine according to claim 15, wherein the content is based on a working status of the working machine or is definable by the operator.

17. The working machine according to claim 15, wherein the sensor performs optical or acoustic detection of a movement of the operator or the position of the operator.

18. The working machine according to claim 17, wherein the sensor includes a camera.

19. The working machine according to claim 15, wherein at least one of the first virtual operating element, the first virtual display, the second virtual operating element, or the second virtual display can be positioned in different positions corresponding to different operating positions to be assumed by the operator on the operator platform.

20. The working machine according to claim 15, wherein the first and second work station positions correspond to different operating positions to be assumed by the operator.

21. The working machine according to claim 20, wherein the work station is at least one of rotatable about a substantially vertical axis of rotation or movable substantially perpendicular to a longitudinal direction of the working machine.

22. The working machine according to claim 21, wherein the projector and the sensor can be moved together with the work station.

* * * * *